(12) United States Patent
Krall

(10) Patent No.: US 11,877,686 B2
(45) Date of Patent: Jan. 23, 2024

(54) FOOD PREPARATION APPARATUS

(71) Applicant: KONINKLIJKE PHILIPS N.V., Eindhoven (NL)

(72) Inventor: Florian Krall, Klagenfurt (AT)

(73) Assignee: KONINKLIJKE PHILIPS N.V., Eindhoven (NL)

(*) Notice: Subject to any disclaimer, the term of this patent is extended or adjusted under 35 U.S.C. 154(b) by 583 days.

(21) Appl. No.: 17/250,145

(22) PCT Filed: Jun. 19, 2019

(86) PCT No.: PCT/EP2019/066122
§ 371 (c)(1),
(2) Date: Dec. 7, 2020

(87) PCT Pub. No.: WO2020/002064
PCT Pub. Date: Jan. 2, 2020

(65) Prior Publication Data
US 2021/0244226 A1 Aug. 12, 2021

(30) Foreign Application Priority Data
Jun. 25, 2018 (EP) .................................. 18179521

(51) Int. Cl.
*A47J 19/02* (2006.01)
*A47J 43/046* (2006.01)
(Continued)

(52) U.S. Cl.
CPC ........... *A47J 19/027* (2013.01); *A47J 43/046* (2013.01); *A47J 43/0716* (2013.01); *A47J 43/255* (2013.01); *A47J 44/00* (2013.01)

(58) Field of Classification Search
CPC .... A47J 19/027; A47J 43/046; A47J 43/0716; A47J 43/255; A47J 44/00
(Continued)

(56) References Cited

U.S. PATENT DOCUMENTS 5,690,021 A * 11/1997 Grey ...................... A47J 19/027
366/205
9,565,872 B2 2/2017 Corkin
(Continued)

FOREIGN PATENT DOCUMENTS

CN 101948728 A 1/2011
DE 4428922 2/1996
(Continued)

OTHER PUBLICATIONS

International Search Report and Written Opinion dated Sep. 10, 2019 For International Application No. PCT/EP2019/066122 Filed Jun. 19, 2019.

*Primary Examiner* — Omar Flores Sanchez
(74) *Attorney, Agent, or Firm* — Maschoff Brennan

(57) ABSTRACT

A food preparation apparatus (2) is provided. The food preparation apparatus comprises: a first food processing unit (10) configured to process a food item to produce a plurality of solid food particles and juice; and a second food processing unit (40) arranged to receive the solid food particles and juice from the first food processing unit and process the juice and solid food particles to produce a substantially homogenous food product, wherein the first food processing unit (10) is adjustable in order to selectively vary the proportion of the produced solid food particles that pass from the first food processing unit into the second food processing unit (40).

14 Claims, 5 Drawing Sheets

(51) Int. Cl.
  *A47J 43/07*    (2006.01)
  *A47J 43/25*    (2006.01)
  *A47J 44/00*    (2006.01)

(58) Field of Classification Search
  USPC .......................................................... 99/501
  See application file for complete search history.

(56) References Cited

U.S. PATENT DOCUMENTS

| | | |
|---|---|---|
| 9,763,469 B2 | 9/2017 | Cheung |
| 2005/0028683 A1* | 2/2005 | Areh ................... A47J 19/023 99/501 |
| 2005/0047272 A1* | 3/2005 | Sands ................ A47J 43/0716 366/205 |
| 2005/0170054 A1 | 8/2005 | Czark |
| 2007/0209528 A1* | 9/2007 | Chang ................. A47J 19/027 99/511 |
| 2013/0312623 A1 | 11/2013 | Cheung |
| 2014/0190359 A1* | 7/2014 | Corkin ................ A47J 19/023 99/511 |
| 2018/0049592 A1* | 2/2018 | Silvis ................. A47J 43/0722 |
| 2022/0378239 A1* | 12/2022 | Lenkeit .................. A47J 19/06 |

FOREIGN PATENT DOCUMENTS

| | | |
|---|---|---|
| DE | 202014009158 | 1/2015 |
| EP | 2594177 | 5/2013 |
| JP | 2003259965 | 9/2003 |
| WO | 2017/144910 | 8/2017 |

* cited by examiner

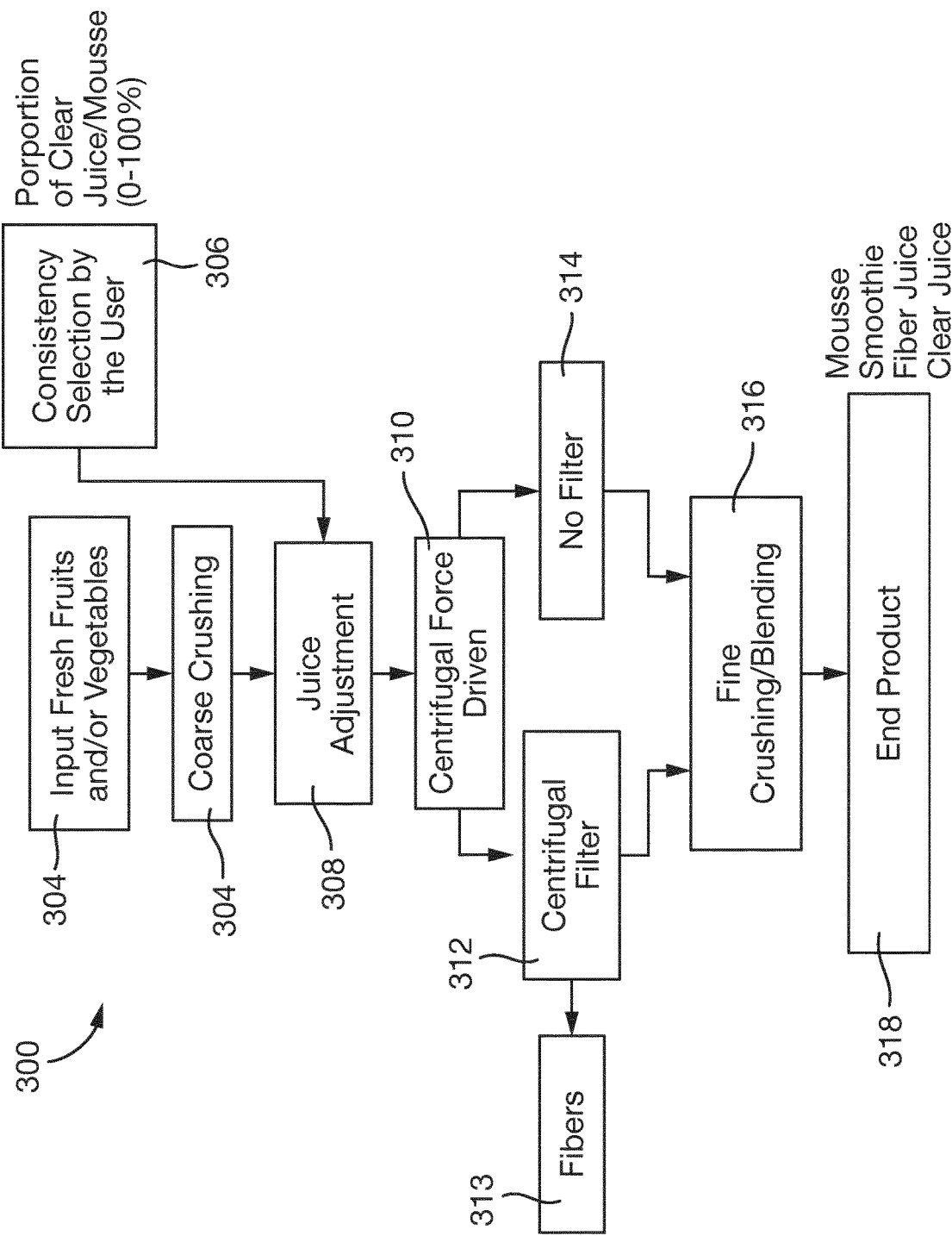

FOOD PREPARATION APPARATUS

CROSS REFERENCE TO RELATED APPLICATIONS

This application is the U.S. National Phase application under 35 U.S.C. § 371 of International Application No. PCT/EP2019/066122 filed Jun. 19, 2019, which claims the benefit of European Patent Application Number 18179521.2 filed Jun. 25, 2018. These applications are hereby incorporated by reference herein.

TECHNICAL FIELD OF THE INVENTION

The present disclosure relates to a food preparation apparatus, and in particular, to a food preparation apparatus for preparing fruit and vegetable based beverages.

BACKGROUND OF THE INVENTION

Blender type food preparation apparatuses are often used to produce fruit and/or vegetable based beverages, such as smoothies. The blender operates by finely chopping pieces of the fruit and/or vegetables within the blender housing in order to break apart the fruit and vegetable fibres and release the juice. The juice and fibres are blended together in order to produce a beverage. The resulting beverage can therefore have a thick, mousse-like consistency, due to the pulp from the fruit and/or vegetables being retained within the beverage.

A US patent application document (US2005170054) discloses a method and apparatus for producing blended dessert products. The apparatus includes a base, a container removably mounted to the base, a cutting member for slicing, chopping and/or grating food products, and a mixing blade in the container for blending the food products once they have been sliced, chopped or grated. However, this document is not specific for fruit and/or vegetable preparation, the technology for desert preparation and fruit and/or vegetable are different, thus, this document fails to provide any motivation for those skilled in the art.

Depending on the particular type of fruit and/or vegetables being blended, it is often necessary to introduce additional liquid, such as water, into the blender, to ensure that the contents of the blender flows sufficiently well to result in a homogenously bended beverage. If the water content is too low, the fruit and vegetable pulp can stick to the walls of the blender away from the blender knife. Furthermore, it is often desirable to add additional liquid to the blender in order to adjust the consistency of the resulting beverage for consumption.

However, adding sufficient water, or other liquid, to the blended beverage to provide the desired consistency can significantly dilute the juice from the fruit and/or vegetables being blended, leading to a beverage with poor flavour.

SUMMARY OF THE INVENTION

According to an aspect of the present disclosure, there is provided a food preparation apparatus comprising:
 a first food processing unit configured to process a food item to produce a plurality of solid food particles and juice, e.g. released from the food item during processing; and
 a second food processing unit arranged to receive the solid food particles and juice from the first food processing unit and process the juice and solid food particles to produce a substantially homogenous food product, e.g. a blended beverage,
 wherein the first food processing unit is adjustable in order to selectively vary the proportion of the produced solid food particles that pass from the first food processing unit into the second food processing unit.

The first food processing unit may comprise a first implement rotatably driven by the food preparation apparatus, the first implement configured to process the food item. For example, the first implement may comprise a plate having one or more cutting elements extending from the surface of the plate. The cutting elements may be arranged to shred, e.g. coarsely shred the food item. Alternatively, the first implement may comprise a blade, such as a blending knife, or any other implement configured to process, e.g. chop, blend, shred, grind or crush, food items The first food processing unit may further comprise a sieve. The sieve may comprise a first sieve portion configured to separate the juice from the solid food particles, and a second sieve portion comprising an aperture at least partially defining an opening for solid food particles to pass though the sieve together with the juice. Adjusting the first food processing unit may comprise varying a dimension or area of the opening through which the solid food particles can pass. The sieve may be arranged about the first implement The sieve may be rotatably driven by the food preparation apparatus together with the first implement. The first sieve portion may comprise a plurality of perforations configured to permit juice to pass through the sieve and to prevent solid particles above a threshold size from passing though the sieve.

The food preparation apparatus may comprise a juice collector configured to collect the juice and solid food particles passing through the sieve and channel the juice and solid food particles to the second food processing unit.

The relative positions of the first implement and the sieve, e.g. the first sieve portion and, optionally, the second sieve portion, may be variable in order to adjust the dimension or area of the opening through which the solid food particles can pass. Adjusting the first food processing unit may comprise varying the relative positions of the first implement and the sieve, e.g. the first sieve portion and, optionally, the second sieve portion. For example, the sieve, e.g. the first and second sieve portions or the first sieve portion may be movable relative to the first implement in order to adjust the dimension and/or area of the opening through which the solid food particles can pass.

The aperture may comprise an elongate slot and a length of the elongate slot through which the solid food particles can pass may be varied by adjusting the relative positions of the first implement and the sieve, e.g. the first sieve portion and, optionally, the second sieve portion. The elongate slot may extend in a principle direction that is parallel with the direction in which the sieve moves relative to the first implement. The sieve may be movable relative to the first implement in a direction parallel with a rotational axis of the first implement.

The first implement and the sieve may be arranged such that the first implement blocks a portion of the aperture, e.g. from the food item being cut by the first implement, thereby reducing the dimension of the opening. The portion of the aperture blocked by the first implement may vary according to the relative positions of the first implement and the sieve, e.g. the second portion of the sieve.

For example, the first implement may comprise a plate having a plurality of cutting elements protruding from the plate to cut the food item. The plate of the first implement may block a portion of the plurality of openings depending on the position of the first cutting implement relative to the second portion of the sieve.

A maximum dimension of the opening through which the solid food particles can pass may be selected based on a maximum size of solid food particles produced by the first implement, e.g. expected to be produced based on the expected performance of the first implement. For example, the maximum dimension of the opening may be selected such that it is greater than or equal to the maximum size of solid food particles produced, or expected to be produced, by the first implement. The first food processing unit may be configured such that the maximum dimension of the opening is approximately 5 mm.

The first food processing unit may be configured such that, when the dimension or area of the opening through which the solid food particles can pass is at a maximum, substantially all of the solid food particles produced by the first food processing unit pass through the sieve.

The first food processing unit may be configured such that, when the dimension or area of the opening through which the solid food particles can pass is at a minimum, substantially all of the solid food particles produced by the first food processing unit are prevented from passing through the sieve. For example, when the opening is at a minimum size, the opening may be substantially closed, e.g. the opening may be completely blocked by the first implement.

The first sieve portion may be aligned, e.g. at least partially aligned, with the first implement when the dimension of the opening through which the solid food particles can pass is at a minimum, e.g. in a direction parallel with the axis of rotation of the first implement.

The second sieve portion may be aligned, e.g. at least partially aligned, with or vertically adjacent to, e.g. immediately vertically adjacent to, the first implement, e.g. cutting elements of the first implement, when the dimension of the opening through which the solid food particles can pass is at a maximum. For example, when the dimension of the opening is at a maximum, the first sieve portion may be on an opposite side of the second sieve portion from the first implement.

The second food processing unit may comprise a second implement, such as a blending knife, rotatably driven by the food preparation apparatus. Axes of rotation of the first and second implements may be substantially aligned. For example, the first and second implements may e provided on a common shaft.

The first and second food processing units may be configured such that the second food processing unit is configured to process the food items to a finer consistency than the first food processing unit. For example, the first implement of the first food processing unit may be a shredding plate and the second implement of the second food processing unit may be a blending knife. In other words, the second food processing unit may be a blender.

The first and second food processing units may be provided within a common housing.

The second food processing unit may comprise a detachable housing, e.g. detachable from the food preparation apparatus that forms a storage container for the substantially homogenous food product. The second implement may be removable from the detachable housing when the detachable housing is detached from the food preparation apparatus.

The second implement may remain coupled to the food preparation apparatus when the detachable housing is detached.

The first and second food processing units may be driven by a common power unit, such as an electric motor.

According to another aspect of the present disclosure, there is provided a food preparation apparatus comprising:
  a first food processing unit arranged to receive a food item introduced into the food preparation apparatus, the first food processing unit comprising:
    a first implement rotatably driven by the food preparation apparatus, the first implement configured to cut the food item into a plurality of solid food particles to encourage juice to be released from the food item; and
    a sieve arranged about the first implement, the sieve comprising a first sieve portion configured to separate the juice from the solid food particles, and a second sieve portion at least partially defining a plurality of openings configured to permit solid food particles to pass though the sieve together with the juice, wherein the first food processing unit is adjustable, such that an area, e.g. the size and/or number, of the plurality of openings through which the solid food particles can pass can be selectively varied; and
  a second food processing unit arranged to receive the juice and solid food particles that have passed through the sieve, wherein the second food processing apparatus comprises:
    a second implement rotatably driven by the food preparation apparatus, the second implement for blending the solid food particles and juice within the second food processing unit, e.g. to produce a substantially homogenous food product, such as a smoothie.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present invention, and to show more clearly how it may be carried into effect, reference will now be made, by way of example, to the accompanying drawings, in which:

FIG. 3 is a flow chart illustrating a method of producing a fruit or vegetable based product.

DETAILED DESCRIPTION OF EMBODIMENTS

Figure 1:
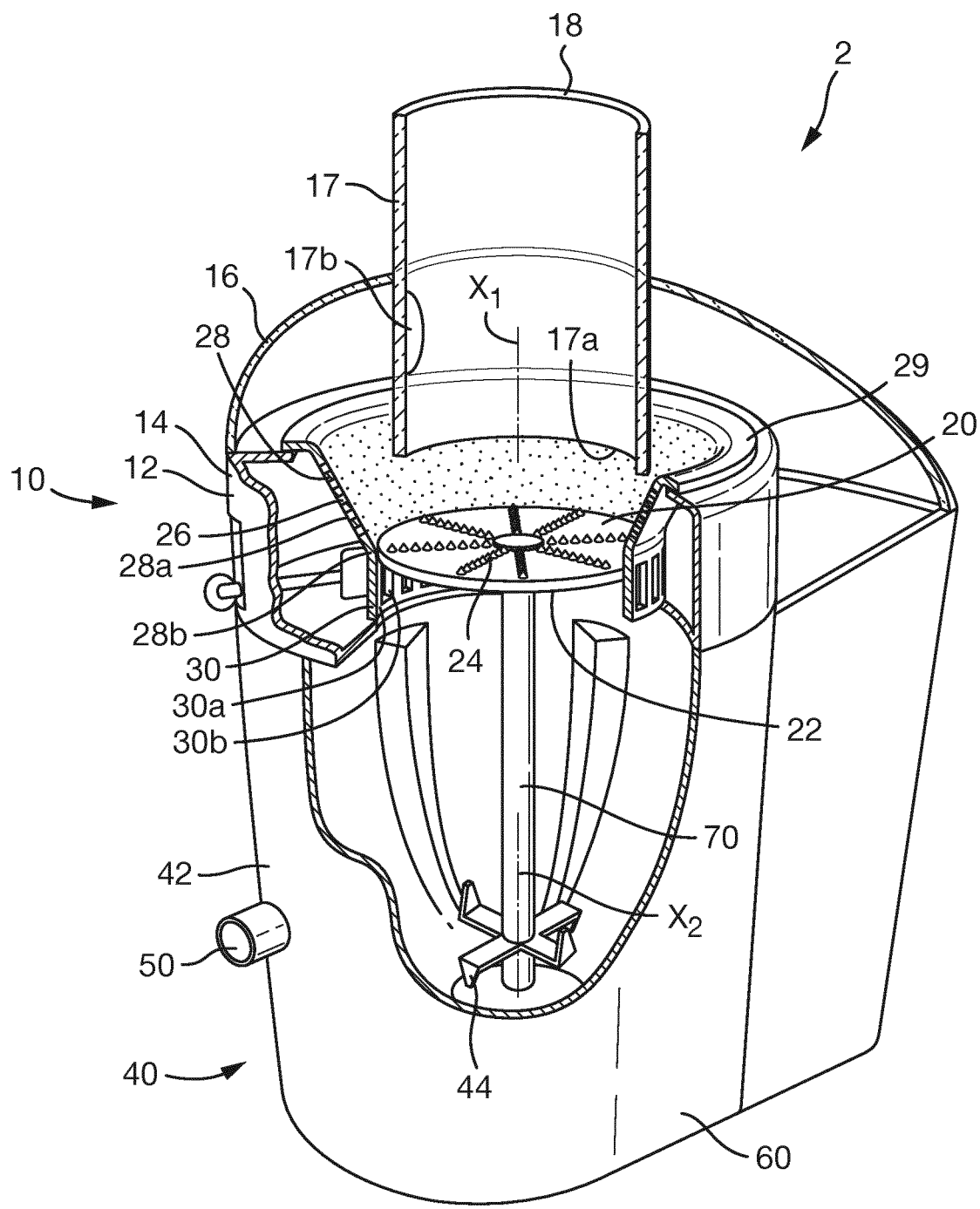
FIG. 1 is a schematic perspective view of the food preparation apparatus, with a cutaway showing internal detail of the food preparation apparatus.

With reference to FIG. 1, a food preparation apparatus 2 comprises a first food processing unit 10 and a second food processing unit 40.

The first food processing unit 10 comprises a first housing 12 having a body portion 14 and a lid portion 16. The lid portion 16 is configured to close the first housing 12 during use of the first food processing unit 10, e.g. to prevent pieces of cut food leaving the first housing 12, and can be detached from the body portion 14 to provide access into the first housing 12, e.g. in order to clean the first food processing unit 10.

The lid portion 16 comprises an inlet opening 18 for introducing food items into the food preparation apparatus 2, e.g. into the first food processing unit, during use of the food preparation apparatus 2.

The first food processing unit 10 further comprises a first implement 20, such as a blade, shredding plate or any other implement configured to process, e.g. chop, blend, shred, grind or crush, food items. The first implement 20 is rotatably mounted within the first housing 12 such that food items introduced into the first food processing unit through the inlet opening 18 arrive at the first implement 20.

As depicted, the lid portion 16 may comprise an inlet guide 17, such as a tube or duct, configured to guide food items that are introduced into the first food processing unit via the inlet opening 18 towards the first implement 20.

In use of the first food processing unit 10, the first implement 20 is rotated within the first housing 12 about an axis of rotation $X_1$, in order to coarsely process, e.g. chop, blend or shred, food items within the first housing 12.

In the arrangement depicted, the first implement 20 comprises a plate 22, extending in a plane perpendicular to a rotational axis $X_1$ of the first implement 20, and a plurality of cutting elements 24 protruding from a side of the plate 22, e.g. the side of the plate 22 facing the inlet opening 18. As depicted, the plate 22 may be substantially circular.

The cutting elements 24 are configured to shred food items contacting the first implement 20 in order to produce shredded food particles and juice that is released from the food item during and after shredding. The solid, shredded food particles and the juice are forced radially outward from the first implement 20, by virtue of the rotation of the plate 22.

As depicted, the inlet guide 17 may extend towards the plate 22 in order to guide the food items towards the first implement 20 in a direction substantially perpendicular to the plane of the plate 22. A gap between an end 17a of the inlet guide 17 adjacent to the plate 22, and the first implement 20 may be sized in order to allow shredded food particles to pass between the inlet guide and the plate 22 in a radially outward direction.

The inlet guide 17 may comprise an anti-rotation feature 17b, configured to resist rotation of the food items within the inlet guide 17, e.g. due to the action the first implement against the food item.

In some arrangements, a food depression tool (not shown) may be provided with the food preparation apparatus 2 for forcing food items through the inlet guide 17 against the first implement 20. The inlet guide 17, food depression tool and first implement may be configured such that larger food items, e.g. large pieces of fruit and/or vegetables or whole fruits or vegetables, can be effectively processed by the first food processing unit 10, e.g. larger pieces compared to a conventional blender.

The first food processing unit 10 further comprises a sieve 26 provided within the first housing 12. The sieve 26 is arranged radially outward from the first implement 20 and may circumferentially surround the first implement 20, such that the shredded food particles and juice leaving the first implement arrive at the sieve 26.

The sieve 26 comprises a first sieve portion 28 comprising a wall 28a having plurality of perforations formed therein.

In some arrangements, the wall 28a may be formed from a mesh material. As depicted, the first sieve portion 28 may be conical in shape. Alternatively, the first sieve portion may be any other desirable shape. The first sieve portion may be shaped such that it is rotationally balanced and may be rotationally symmetrical. For example, it may be cylindrical, conical, spherical or polygonal. A central axis, e.g. about which the first sieve portion is rotationally balanced and/or has rotational symmetry. The central axis of the first sieve portion 28 may be aligned with or parallel to the rotational axis $X_1$ of the first implement 20.

As depicted in FIG. 1, the wall 28a of the first sieve portion 28 may extend from a lower end 28b of the first sieve portion 28 to an upper end 28c in a direction with a compost in radially outward direction. In other words, the first sieve portion 28 may be conical in shape. In other arrangements, the first sieve portion 28 may be substantially cylindrical in shape and the wall 28a may extend in a substantially vertically upward direction between the lower and upper ends 28b, 28c.

The perforations in the wall 28a are sized to allow the juice released from the food item to pass though the sieve 26, whilst restricting the solid, shredded food particles from passing though. The sizes of the perforations in the first sieve portion 28 may be selected such that substantially none of the shredded food particles are able to pass through the sieve 26. For example, the size of the perforations may be between 0.2 And 0.8 mm in diameter. However, it will be appreciated that a certain amount of small food particles, e.g. fruit or vegetable fibres, may pass through the sieve 26 together with the juice.

The sieve 26 and the first implement 20 may be configured such that a seal is created between the sieve 26 and the first implement 20 around the outer periphery of the first implement 20, e.g. around the plate 22. Shredded food particles are thereby restricted from bypassing the sieve 26 to pass into the juice collector 32 described below.

The sieve 26 may be configured to rotate together with the first implement 20. In the arrangements shown, the sieve 26 is coupled to the first implement 20 and is rotatably driven by the first implement 20. However, in other arrangements, the sieve may be rotated separately from the first implement 20.

The shredded food particles collected in the sieve 26 may be forced outwards against the wall 28a of the first sieve portion 28 by virtue of the rotation of the sieve 26. Forcing the shredded food particles against the wall 28a may encourage juice to be released from the shredded particles. The juice from the shredded food item may pass though the sieve under the action of the rotation of the sieve, e.g. in a substantially radial direction.

The shredded food particles collecting in the first portion 28 of the sieve 26 may be retained in the sieve and may gradually travel upwards, along the wall 28a of the first sieve portion, to the upper end 28c of the wall 28a by virtue of the rotation of the sieve 26. The first sieve portion 28 may comprise an outwardly, e.g. radially outwardly, extending flange or lip 29, which acts to restrict the shredded food particles from passing over the upper end 28c of the wall and falling between the sieve 26 and the first housing 12 to reach the juice collector 32 described below. The first housing 12 may comprise a corresponding flange projecting outwardly from the wall of the first housing 12 towards the sieve 26, which acts together with the lip 29 to restrict shredded food particles from passing between the first housing 12 and the sieve 26.

The first food processing unit 10 may further comprise a pulp outlet 15 arranged to allow the shredded food particles reaching the upper end 28c of the sieve wall 28a to be discharged from the first food processing unit 10. The pulp outlet 15 may be at least partially aligned with the lip 29.

The sieve 26 further comprises a second sieve portion 30. As depicted, the second sieve portion 30 may be cylindrical. However in other arrangements, the second sieve portion may be any other desirable shape. In the same way as the first sieve portion, the second sieve portion 30 may be shaped such that it is rotationally balanced and may be rotationally symmetrical. For example, it may be cylindrical, conical, spherical or polygonal. A central axis, e.g. about which the second sieve portion 30 is rotationally balanced and/or has rotational symmetry. The central axis of the second sieve portion 30 may be aligned with or parallel to the rotational axis $X_1$ of the first implement 20.

The second sieve portion 30 comprises a wall 30a having a plurality of apertures 30b. As depicted, the second sieve portion 30 may extend from the lower end 28b of the first sieve portion 28 in a vertically downwards direction, e.g. a direction parallel with the axis of rotation $X_1$ of the first implement 20. The wall 30a of the second sieve portion is coupled to the wall 28a of the first sieve portion 28 at the lower end 28b of the first sieve portion 28. In some arrangements, the walls 28a, 30a of the first and second sieve portions 28, 30 may be integrally formed.

The apertures 30b are larger than the perforations in the first sieve portion 28, and are sufficiently large to permit solid, shredded food particles to pass through the sieve 26 together with the juice. However, as depicted in FIG. 1, the first implement 20, e.g. the plate 22, can be positioned to block off at least part of the apertures 30b from the shredded food particles, so that the solid food particles cannot pass through the apertures 30b.

Figure 2A:
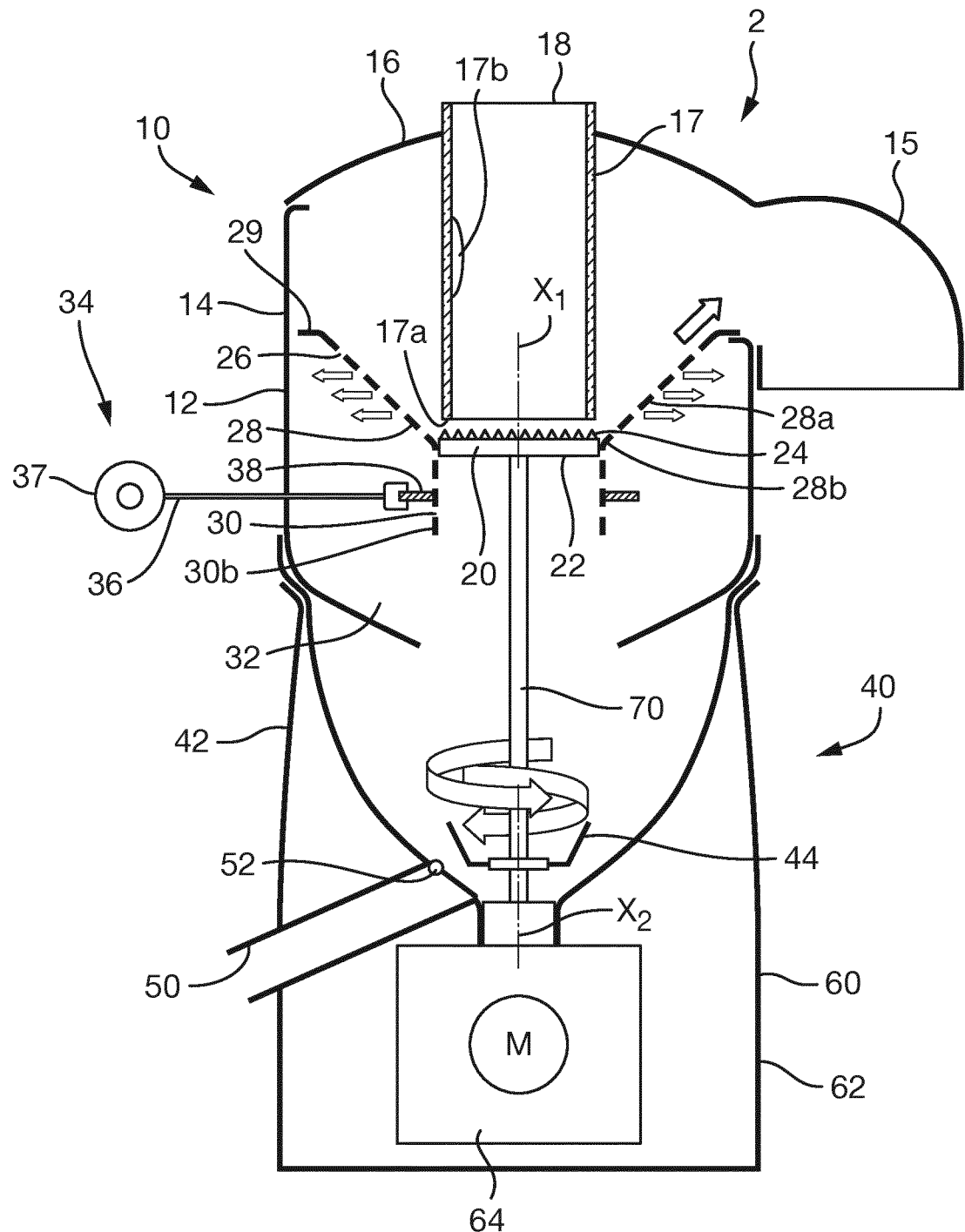
FIGS. 2a and 2b are schematic sectional views of a food preparation apparatus in first and second configurations respectively.
Figure 2B:
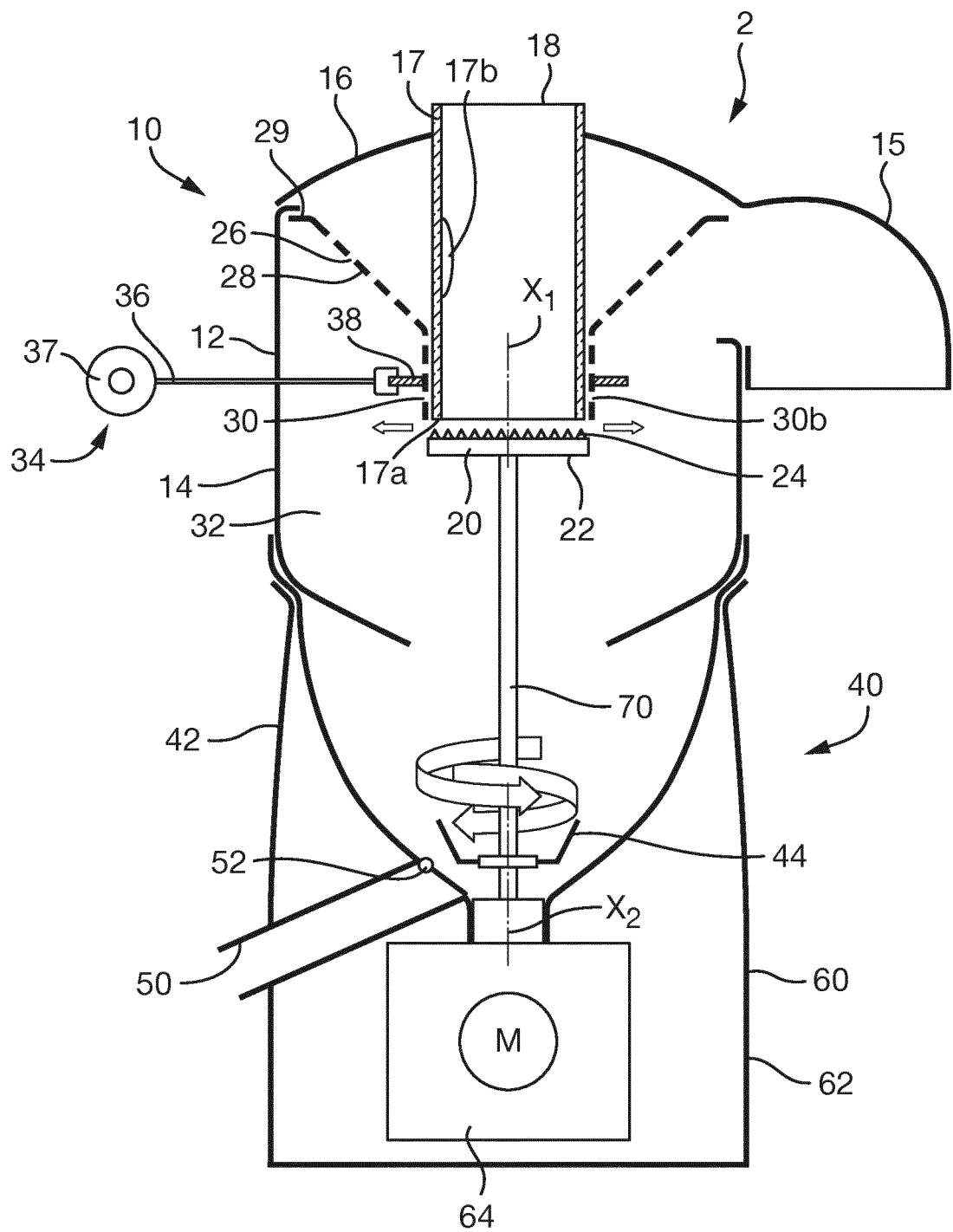

With reference to FIGS. 2a and 2b, the food preparation apparatus 2 is configured such that the first food processing unit 10 is adjustable in order to adjust the proportion of the solid, shredded food particles able to pass through the sieve 26. More particularly, in the arrangement depicted in FIGS. 2a and 2b, the first food processing unit can be adjusted by displacing the sieve 26 relative to the first implement 20.

As depicted in FIG. 2a, when the food preparation apparatus 2 is in a first configuration, e.g. when the sieve 26 is arranged in a first position, the sieve 26 is arranged relative to the first implement 20 such that the first sieve portion 28 is axially adjacent, e.g. immediately axially adjacent to the first implement 20, e.g. in a direction parallel with the axis of rotation $X_1$ of the first implement 20. In some arrangements, the first sieve portion 28 may be at least partially aligned with the first implements 20, e.g. the cutting elements 24 of the first implement 20, in the direction parallel with the axis of rotation $X_1$ of the first implement 20.

In the first configuration, the second sieve portion 30 is arranged such that the apertures 30b are blocked from the shredded food particles by the first implement 20, e.g. by the plate 22. Hence, no openings are provided by the apertures 30b for the shredded food particles and juice to pass through the sieve 26.

As depicted in FIG. 2b, the food preparation apparatus 2 can be adjusted into a second configuration, in which the sieve 26 is displaced relative to the first implement 20 to a second position.

As shown, the food preparation apparatus 2, may comprise a sieve adjustor 34, which can be operated by the user in order to displace the sieve 26 between the first and second positions. In the arrangements shown, the sieve adjustor 34 comprises a lever 36 coupled to a flange 38 formed on the sieve 26. The lever 36 can be raised or lowered by the user in order to adjust the position of the sieve 26. The lever 36 comprises a handle 37 to be gripped by the user.

In other arrangements, the sieve adjustor 34 may comprise a lever or handle that is movable in any other way in order to adjust the position of the sieve. For example, the sieve adjustor may be configured such that the lever or handle can be pulled, pushed, rotated and/or twisted in order to adjust the position of the sieve 26. Furthermore, the sieve adjustor 34 may comprise any desirable linkage or mechanisms in order to appropriately convert movement of the lever or handle to movement of the sieve 26 between the first and second positions.

The sieve adjustor 34 may be configured such that the sieve 26, lever 36 and handle 37 remain in the position they are placed in by the user during operation of the food preparation apparatus 2. For example, the sieve adjustor 34 may comprise a ratchet mechanism for maintaining the position of the lever 36.

When the sieve 26 is in the second position, a part of the second sieve portion is aligned with or is axially adjacent to the cutting elements 24 of the first implement 20, e.g. with respect to the axis of rotation $X_1$ of the first implement 20. In the arrangement shown in FIG. 2b, parts of the second sieve portion are aligned with and positioned vertically adjacent to, e.g. vertically above, the first implement 20. In this position, at least a portion of the apertures 30b are exposed to the shredded food particles and juice produced by the first implement 20. Openings are thereby defined by the apertures 30b and the first implement 20, which allow a proportion of the solid, shredded food particles to pass through the sieve 26 together with the juice.

The sieve 26 may be moved between the first and second positons in a direction parallel with the axis of rotation $X_1$ of the first implement 20. In the arrangements depicted, the sieve 26 is moved in a substantially vertical direction.

The apertures 30b may be formed such that a dimension of the openings provided by the apertures varies as the sieve 26 moves between the first and second configurations. For example, as depicted in FIG. 1, the apertures 30b may be elongate and may extend in a direction parallel to the direction in which the sieve 26 moves relative to the first implement 20 between the first and second positions. As the sieve moves relative to the first implement, the length of the elongate aperture 30b that is blocked off by the first implement 20 varies in order to vary the dimension of the opening.

The apertures 30b may be sized according to the size of solid food particles expected to be produced by the first food processing unit. For example, the size of solid food particles expected to be produced may be known based on the design of the first implement. The apertures 30b may be arranged such that a maximum size of the openings defined by the apertures is equal to or greater than the maximum size of solid food particles expected to be produced by the first food processing unit. For example, the apertures 30b may be configured such that the maximum size of the openings is greater than or equal to 5 mm.

The apertures 30b may be sized such that, when the food preparation apparatus 2 is in the second configuration, substantially all of the shredded food particles pass though the sieve via the openings provided by apertures 30b.

As described above, the first implement 20 and the sieve 26 are arranged within the first housing 12 of the first food processing unit. An interior of the first housing 12 may form a juice collector 32 and the juice and solid, shredded food particles that have passed through the sieve 26 pass into the juice collector 32. The juice collector 32 is arranged to channel the collected juice and solid particles into the second food processing unit 40. The second food processing unit 40 comprises a second housing 42, an interior of which forms a container for receiving the juice from the first food processing unit 10. In the arrangement depicted, the second housing 42 of the second food processing unit 40 is configured to detachably couple to the first housing 12 of the first food processing unit 10 to enable the food preparation to be disassembled, e.g. for cleaning. However, in other arrangements, the housings 12, 42 of the first and second food processing units may be integrally formed.

The second food processing unit 40 further comprises a second implement 44 rotatably mounted within the housing. The second implement 44 is rotated about an axis of rotation $X_2$, in order to process, e.g. blend and mix, juice and solid food particles contained by the housing in order to produce a homogenous, e.g. blended, food product, such as a fruit and/or vegetable juice or smoothie beverage. As depicted, the second implement 44 may comprise a blending knife. However, in other arrangements, the second implement 44 may comprise any other implement capable of processing, e.g. blending and mixing, the juice and solid food particles.

In the arrangement depicted, the axes of rotation $X_1$, $X_2$ of the first and second implements 20, 44 are aligned, e.g. coaxially. However, in other arrangements, the axes of rotation $X_1$, $X_2$ of the first and second implements 20, 44 may be spaced apart from one another and/or arranged at an angle, e.g. a non-zero angle, relative to one another.

The food preparation apparatus 2 further comprises an outlet pipe 50 in fluid communication with the interior of the second housing 42 of the second food processing unit 40. The food preparation apparatus 2 may further comprise a valve 52 configured to selective open and close the outlet pipe 50 to control the flow of the beverage from the second food processing unit 40 into the outlet pipe 50.

The food preparation apparatus 2 further comprises a base 60. As depicted, a housing 62 of the base 60 may be integrally formed with the second housing 42 of the second food processing unit 40. However, in other arrangements, the housing 62 may be separate from the second housing 42. In such arrangements, the housing 62 of the base 60 may be detachably couplable with the second housing 42 of the second food processing unit 40.

The base further comprises a power unit, e.g. an electric motor 64, arranged within the housing for rotatably driving the first and/or second implements 20, 44 about their respective axes $X_1$, $X_2$. As depicted in FIGS. 1, 2a and 2b the first and second implements 44 may be mounted on a common shaft 70 and may be driven by the electric motor 64 as a common power unit. In some arrangements, the shaft 70 may be an armature shaft of the electric motor 64 or may be directly connected to the armature shaft. In other arrangements, the first and second implements 20, 44 may be mounted on different shafts, which may be driven by different power units, e.g. provided as part of the base 60.

With reference to FIG. 3, the food preparation apparatus may be operated to produce a food product using a method 300. The method comprises a first step 302, in which food items, such as fruit and/or vegetables are introduced into the food preparation apparatus, e.g. via the inlet opening 18.

As described above, the food items may be guided from the inlet opening 18 to the first implement 20 by the inlet guide 17. In a second step 304 of the method 300, the food items may be coarsely processed, e.g. shredded, by the first implement 20.

The method 300 further comprises a consistency selection step 306, in which a user of the food preparation apparatus selected the desired consistency of the food product to be produced. In a third step 308, the position of the sieve 26 is adjusted relative to the first implement 20, e.g. using the sieve adjustor 34, to control the proportion of solid food particles able to pass through the sieve 26 into the juice collector 32 and thereby determine the consistency of the food product being produced.

The method 300 further comprises a fourth step 310, in which the juice and solid food particles produced by the first implement 20 are forced outward towards in the sieve 26, e.g. by virtue of the rotation of the first implement 20. Depending on the position of the sieve 26, the juice and solid food particles may be sieved in a fifth step 312 of the method or may be passed into the juice collector 32 in a sixth step 314. When the sieve 26 is positioned at an intermediate position between the first and second positions, the fifth and sixth steps 312, 314 may be performed substantially simultaneously as solid food particles having different sizes are sieved out or allowed to pass through the sieve 26.

The method 300 may further comprise a pulp discharge step 313 in which pulp that has collected in the sieve 26 is discharged through the pulp outlet 15, as described above.

The method 300 comprises a seventh step 316, in which the juice and food particles that have passed through the sieve 26 are processed, e.g. finely blended, by the second implement 44 to produce the food product.

It will be appreciated, that in some arrangements, one, more than one or each of the steps of the method may be performed substantially simultaneously for at least a portion of their duration.

Furthermore, during the method 300, the consistency selection step 306 and the third step 308 may be repeated one or more times in order to adjust the consistency of the food product being produced, e.g. if the user determines that the food product being produced does not have the desired consistency.

Additionally or alternatively, the consistency selection step 306 and the third step 308 may be repeated one or more times in order to adjust the proportion of the solid particles being permitted to pass through the sieve in order to ensure that the mixture of juice and solid particles being processed by the second food processing unit is sufficiently flowable to allow a homogenous food product to be produced. For example, when the method 300 is begun, a low proportion of solid particles may initially be permitted to pass through the sieve 26, and the proportion of solid particles may be progressively increased as more juice passes into the second food processing unit 40 until a desired consistency is achieved.

The method 300 may comprise an eighth step 318, in which the food product is let out from the food preparation apparatus 2, e.g. via the outlet pipe 50.

Figure 4:
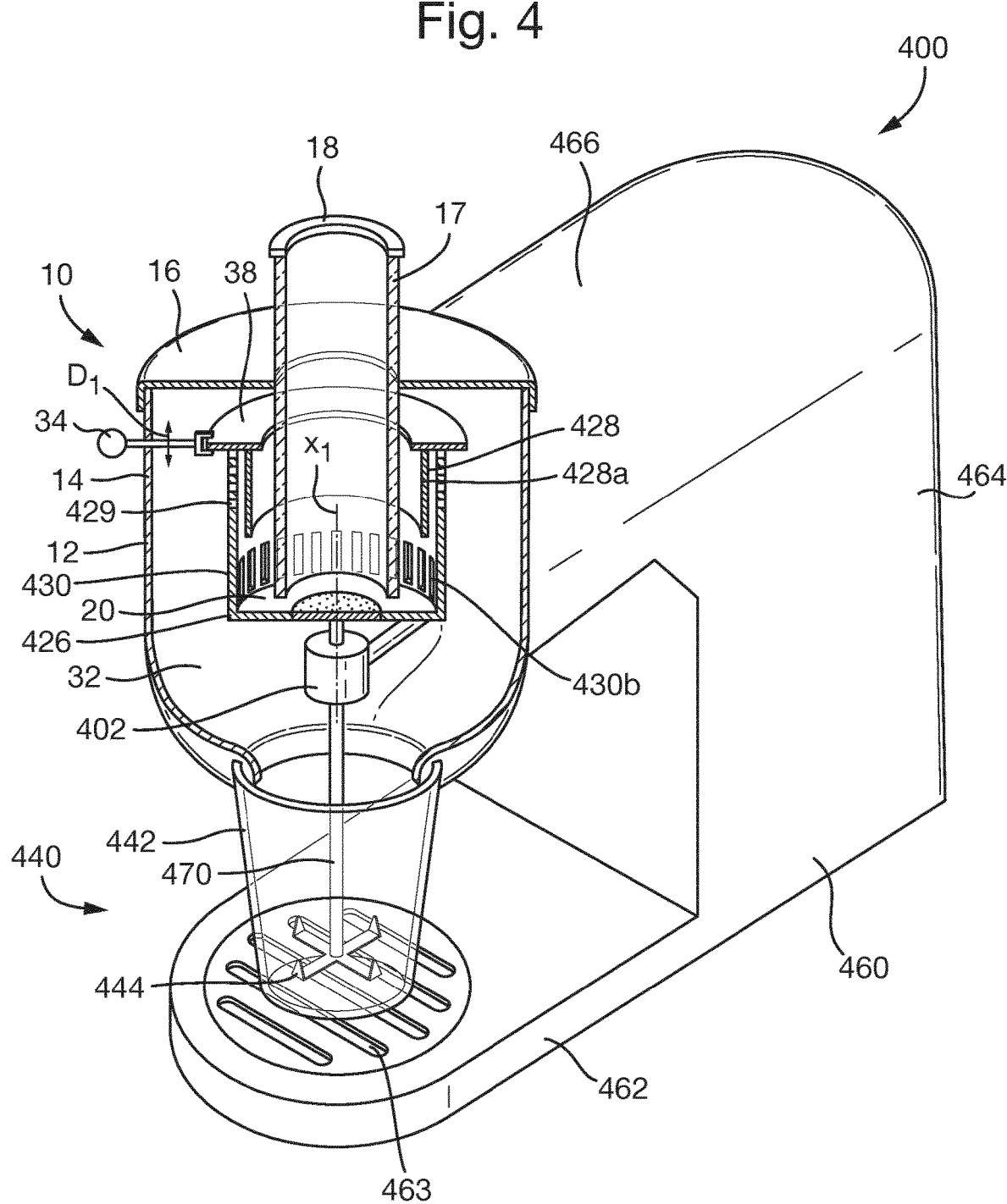
FIG. 4 is a schematic perspective view of another food preparation apparatus, with a cutaway showing internal detail of the food preparation apparatus.

With reference to FIG. 4, a food preparation apparatus 400 according to other arrangements of the present disclosure will now be described. The food preparation apparatus 400 is substantially the same as the food preparation apparatus 100 described above, and the features described in relation to the food preparation apparatus 100 may apply equally to the food preparation apparatus 400.

The food preparation apparatus 400 differs from the food preparation apparatus 100, in that a second sieve portion 430 of a sieve 426 of the food preparation apparatus 400 is mounted in a fixed position relative to the first implement 20. As depicted, the second sieve portion 430 is mounted in a position in which apertures 430b formed in the second portion are adjacent to the first implement 20, e.g. not blocked by the first implement 20.

A first sieve portion 428, which is similar to the first sieve portion 28, is movable relative to the first implement 20 and the second sieve portion 430 in order to selectively cover, e.g. block off, a portion of the apertures 430*b* and thereby vary the size of openings provided by the apertures 430*b* through which the solid food particles may pass.

When the first sieve portion 428 is positioned as shown in FIG. 4, the apertures 430*b* are uncovered by the first sieve portion 428 such that juice and solid food particles can pass though the apertures 430*b* into the juice collector 32.

The first sieve portion 428 may be movable in a direction Di, e.g. upwards and downwards. The direction Di may be parallel with the axis of rotation $X_1$ and may be parallel with a central axis of the second sieve portion 430. The first sieve portion 428 may be movable such that that apertures 430*b* are covered, e.g. at least partially covered, by a perforated wall portion 428*a* of the first sieve portion 428. Hence, when the apertures 430*b* are covered by the wall portion 428*a*, juice produced by processing food items may pass through the first sieve portion 428 and the apertures 430*b*, whilst the solid food particles may be prevented from passing though the apertures by the first sieve portion 428.

The food preparation apparatus 400 may comprise a resilient element 429, such as a spring, configured to bias the first sieve portion 428 into a position in which the openings provided by the apertures 430*b* are at a maximum size. Alternatively, the resilient element 429 may be configured to bias the first sieve portion 428 into a position in which the openings provided by the apertures 430*b* are at a minimum size, e.g. substantially or fully closed. Alternatively again, the resilient element may be omitted.

In some arrangements, the resilient element 429 may be configured to bias the position of the first sieve portion upwards, e.g. in order to balance the weight of the first sieve portion 428.

The food preparation apparatus 400 also differs from the food preparation apparatus 100 in that a second housing 442 of a second food processing unit 440 of the food preparation apparatus 400 is detachably couplable to the first food processing unit 10, e.g. to the first housing 12, such that the second housing 442 is supported on the food preparation apparatus 400 by virtue of its connection with the first food processing unit 10.

When the second housing 442 is decoupled from the first food processing unit the housing can be removed from the food preparation apparatus 400. The second housing 442 can then be used as a storage container for the beverage produced by the food preparation apparatus 400. A user may consume the food product directly from the second housing 442 or may pour the food product into another vessel to be stored, consumed or used in a further food preparation process.

As depicted in FIG. 4, when the second housing 442 is coupled to the first food processing unit 10, a second implement 444 of the second food processing unit is arranged within the second housing 442. The second implement 44 may be supported on a shaft 470 extending from the first implement 20 of the first food processing unit 10 and can be rotatably driven within the second housing 442 to blend and mix juice and solid food particles within the second housing 442 in order to produce a substantially homogenous food product, as described with reference to FIGS. 1 to 3 above.

When the second housing 442 is decoupled from the first food processing unit the second housing 442 can be removed from the food preparation apparatus 400 whilst the second implement 444 remains coupled to the first food processing unit 10 by the shaft 470.

The food preparation apparatus further comprises a base 460. As depicted in FIG. 4, the base comprises a housing 464 arranged to one side of the first and second food processing units 10, 440. The power unit of the food preparation apparatus 400, such as an electric motor, may be housed within the housing 464.

The base 460 further comprises a base plate 462 extending from the housing 464 under the second housing 442 in order to improve the stability of the food preparation apparatus 400. The base plate may comprise a drip tray 463 arranged beneath the second housing 442 to catch drips from the first food processing unit 10 when the second housing 442 is not coupled to the first food processing unit 10.

The food preparation apparatus 400 further comprises a support arm 466 extending from the base 460 to the first housing 12 of the first food processing unit 10 for supporting the first and second food processing units 10, 440 relative to the base 460. As depicted, the armature shaft of the electric motor, or a shaft driven by the electric motor, may extend along the arm 466 for supplying power to the first and second implements 20, 444.

As depicted, the armature shaft may be arranged at an angle, e.g. a non-zero angle, relative to the shaft 70. For example, the armature shaft may be arranged at approximately 90 degrees to the shaft 70. The food preparation apparatus 400 may further comprise a drive transfer 402, for transferring rotary drive from the power unit, e.g. from the armature shaft, to the shaft 470. The drive transfer 402 may be configured to transmit the drive through the angle between the armature shaft and the shaft 70.

In the arrangement shown, the first and second implements 20, 444 are rotatably driven by a common shaft 70. However, in other arrangements, the first and second implements 20, 444 may be driven by different shafts that may be arranged at an angle relative to one another and/or space apart from one another.

In some arrangements, the arm 466 may be pivotally coupled to the base 460 to allow the first and second food processing units to be tilted relative to the base in order increase the size of the gap between the second housing 442 and the base plate 462, thereby improving the ease with which the second housing 442 can be detached from the first food processing unit 10.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

The invention claimed is:

1. A food preparation apparatus comprising:
    a first food processing unit configured to process a food item to produce a plurality of solid food particles and juice; and
    a second food processing unit arranged to receive the solid food particles and juice from the first food processing unit and process the juice and solid food particles to produce a substantially homogenous food product,
    the first food processing unit comprises:
        a first implement rotatably driven by the food preparation apparatus, the first implement configured to process the food item; and a sieve arranged about the first implement, the sieve comprising a first sieve portion configured to separate the juice from the solid food particles, and a second sieve portion comprising an aperture at least partially defining an opening for solid food particles to pass though the sieve together with the juice, wherein the first food processing unit is adjustable in order to selectively vary the proportion of the produced solid food particles that pass from the first food processing unit into the second food processing unit, wherein adjusting the first food processing unit comprises varying a dimension of the opening through which the solid food particles can pass.

2. The food preparation apparatus of claim 1, wherein the relative positions of the first implement and the sieve are variable in order to adjust the dimension of the opening through which the solid food particles can pass, wherein adjusting the first food processing unit comprises varying the relative positions of the first implement and the sieve.

3. The food preparation apparatus of claim 2, wherein the sieve is movable relative to the first implement in order to adjust the dimension of the opening through which the solid food particles can pass.

4. The food preparation apparatus of claim 3, wherein the sieve is movable relative to the first implement in a direction parallel with a rotational axis of the first implement.

5. The food preparation apparatus of claim 2, wherein the first implement and the sieve are arranged such that the first implement blocks a portion of the aperture, the portion varying according to the relative positions of the first implement and the sieve.

6. The food preparation apparatus of claim 2, wherein a maximum size of the opening through which the solid food particles can pass is selected based on a maximum size of solid food particles produced by the first implement.

7. The food preparation apparatus of claim 2, wherein the first food processing unit is configured such that, when the dimension of the opening through which the solid food particles can pass is at a maximum, substantially all of the solid food particles produced by the first food processing unit pass through the sieve.

8. The food preparation apparatus, of claim 2, wherein the first sieve portion is at least partially aligned with or vertically adjacent to the first implement when the dimension of the opening through which the solid food particles can pass is at a minimum.

9. The food preparation apparatus of claim 1, wherein the second sieve portion is at least partially aligned with or vertically adjacent to the first implement when the dimension of the plurality of openings through which the solid food particles can pass is at a maximum.

10. The food preparation apparatus of claim 1, wherein the second food processing unit comprises a second implement rotatably driven by the food preparation apparatus, wherein axes of rotation of the first and second implements are concentrically aligned.

11. The food preparation apparatus of claim 1, wherein the first and second food processing units are provided within a common housing.

12. The food preparation apparatus of claim 1, wherein the second food processing unit comprises a detachable housing that forms a storage container for the substantially homogenous food product.

13. The food preparation apparatus of claim 1, wherein the first and second food processing units are driven by a common power unit.

14. The food preparation apparatus of claim 1, wherein the second food processing unit comprises a blender.

* * * * *